US010300546B2

(12) United States Patent
Hlavaty (10) Patent No.: US 10,300,546 B2
(45) Date of Patent: May 28, 2019

(54) SPHERICAL ARTICULATING FIXTURE (71) Applicant: United Technologies Corporation, Farmington, CT (US)

(72) Inventor: Kirk D. Hlavaty, East Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 70 days.

(21) Appl. No.: 15/418,093

(22) Filed: Jan. 27, 2017

(65) Prior Publication Data
US 2018/0214965 A1    Aug. 2, 2018

(51) Int. Cl.
| B23K 3/08 | (2006.01) |
| B05C 13/00 | (2006.01) |
| B05D 1/00 | (2006.01) |
| B23K 1/00 | (2006.01) |
| B33Y 30/00 | (2015.01) |
| B33Y 80/00 | (2015.01) |
| B23K 37/04 | (2006.01) |
| B23Q 1/54 | (2006.01) |
| B23Q 3/06 | (2006.01) |
| B25B 1/20 | (2006.01) |
| B25B 1/22 | (2006.01) |
| B25B 5/14 | (2006.01) |
| B23K 101/00 | (2006.01) |

(52) U.S. Cl.
CPC .............. *B23K 3/087* (2013.01); *B05C 13/00* (2013.01); *B05D 1/00* (2013.01); *B23K 1/0018* (2013.01); *B23K 37/0443* (2013.01); *B23Q 1/545* (2013.01); *B23Q 3/06* (2013.01); *B25B 1/20* (2013.01); *B25B 1/22* (2013.01); *B25B 5/14* (2013.01); *B33Y 30/00* (2014.12); *B33Y 80/00* (2014.12); *B23K 2101/001* (2018.08)

(58) Field of Classification Search
None
See application file for complete search history.

(56) References Cited

U.S. PATENT DOCUMENTS

| 1,530,566 | A | * | 3/1925 | Lobbett | .................... | B25B 1/22 |
| | | | | | | 269/101 |
| 1,673,990 | A | * | 6/1928 | O'Brien | .................... | B25B 1/22 |
| | | | | | | 269/240 |
| 2,796,788 | A | | 6/1957 | Bohn et al. | | |
| 3,867,032 | A | | 2/1975 | Bruck | | |
| 4,157,876 | A | | 6/1979 | DiGiulio | | |
| 6,560,890 | B1 | * | 5/2003 | Madge | .................. | B23K 26/10 |
| | | | | | | 33/549 |
| 2007/0234549 | A1 | | 10/2007 | Sherlock et al. | | |

FOREIGN PATENT DOCUMENTS

DE    10340052 A1    5/2005

OTHER PUBLICATIONS

Extended European Search Report, for European Patent Application No. 18153165.8, dated Jul. 10, 2018, 9 pages.

* cited by examiner

*Primary Examiner* — Jethro M. Pence
(74) *Attorney, Agent, or Firm* — Kinney & Lange, P.A.

(57) ABSTRACT

A fixture includes a base with a bottom and a rim, a clamp with an exterior in a shape of a portion of a clamp sphere and a component space that is wholly within the clamp sphere, wherein the clamp is positioned such that the clamp exterior is in contact with the rim.

18 Claims, 5 Drawing Sheets

SPHERICAL ARTICULATING FIXTURE

BACKGROUND

This application relates to fixtures for holding components, and more particularly, to an articulating fixture for holding components while work is being performed on them.

Some gas turbine engine components are brazed together which requires the application of braze paste to one or more components. The application of braze paste is traditionally a manual process wherein operators hold the components in their hand(s) and manipulate them in order to apply the paste to all of the appropriate areas. During this process, the operators can transfer the paste to areas that are not supposed to receive it (for example, airfoil aerodynamic surfaces). The paste can be difficult to remove and can irreparably contaminate the component, causing waste. In addition, operators can be fatigued by having to repeatedly hold and manipulate the parts while applying the paste.

SUMMARY

According to one embodiment, a fixture includes a base with a bottom and a rim, a clamp with an exterior in a shape of a portion of a clamp sphere and a component space that is wholly within the clamp sphere, wherein the clamp is positioned such that the clamp exterior is in contact with the rim.

According to another embodiment, a method of using a fixture that includes a clamp with a spherical exterior, a first portion with a first contact surface, a second portion with a second contact surface, and a base with a spherical or circular rim of the base, the method including placing a component in contact with the first contact surface of the first portion of the clamp. The method also includes placing the second contact surface of the second portion of the clamp in contact with the component, placing the spherical exterior of the clamp into contact with the rim of the base such that the component is in a first orientation, applying a coating to a first area of the component, and exerting force on the clamp to orient the component in a second orientation.

According to another embodiment, a fixture includes a base having a bottom and an elevated rim, and a clamp having an exterior in a shape of a portion of a sphere, the clamp including a component space that is positioned wholly within the sphere, wherein the clamp is configured to be positioned in in contact with the rim. The fixture is made by the steps of selectively sintering a first layer of pulverulent material within a frame to make a partially built fixture, lowering the partially built fixture, adding a second layer of pulverulent material on top of the partially built fixture, and selectively sintering the second layer of pulverulent material to the partially built fixture.

DETAILED DESCRIPTION

Figure 1:
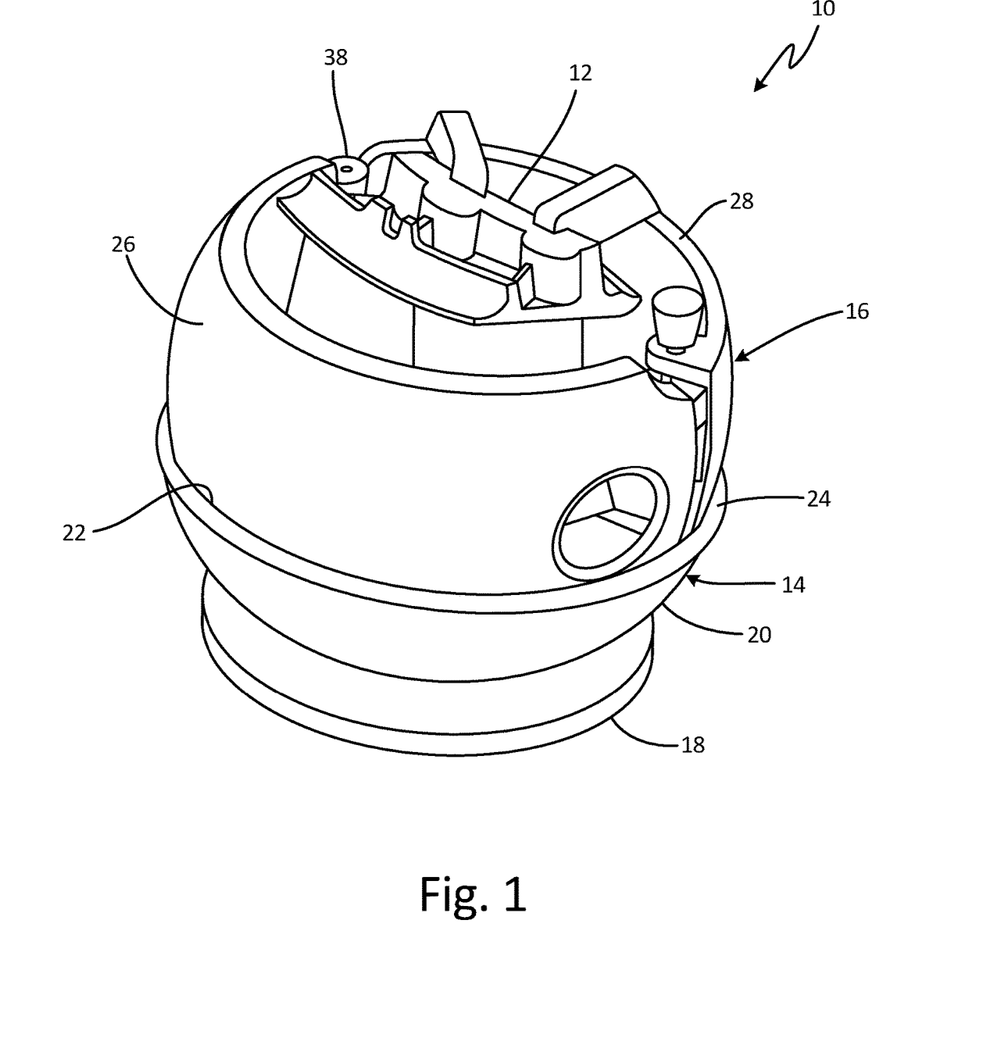
FIG. 1 is a perspective view of a spherical articulating fixture with a component or part.

FIG. 1 is a perspective view of spherical articulating fixture 10 with part 12. In the illustrated embodiment, base 14 includes a planar bottom 18 such that base 14 can rest stably on, for example, a workbench (not shown). Extending upward from bottom 18 is bowl 20. Bowl 20 has a spherical internal surface 22 that terminates at rim 24. Internal surface 22 has a radius of curvature $R_B$ (shown in FIG. 2) and subtends less than an entire hemisphere. Rim 24 is substantially planar and has a circular shape.

Figure 2:
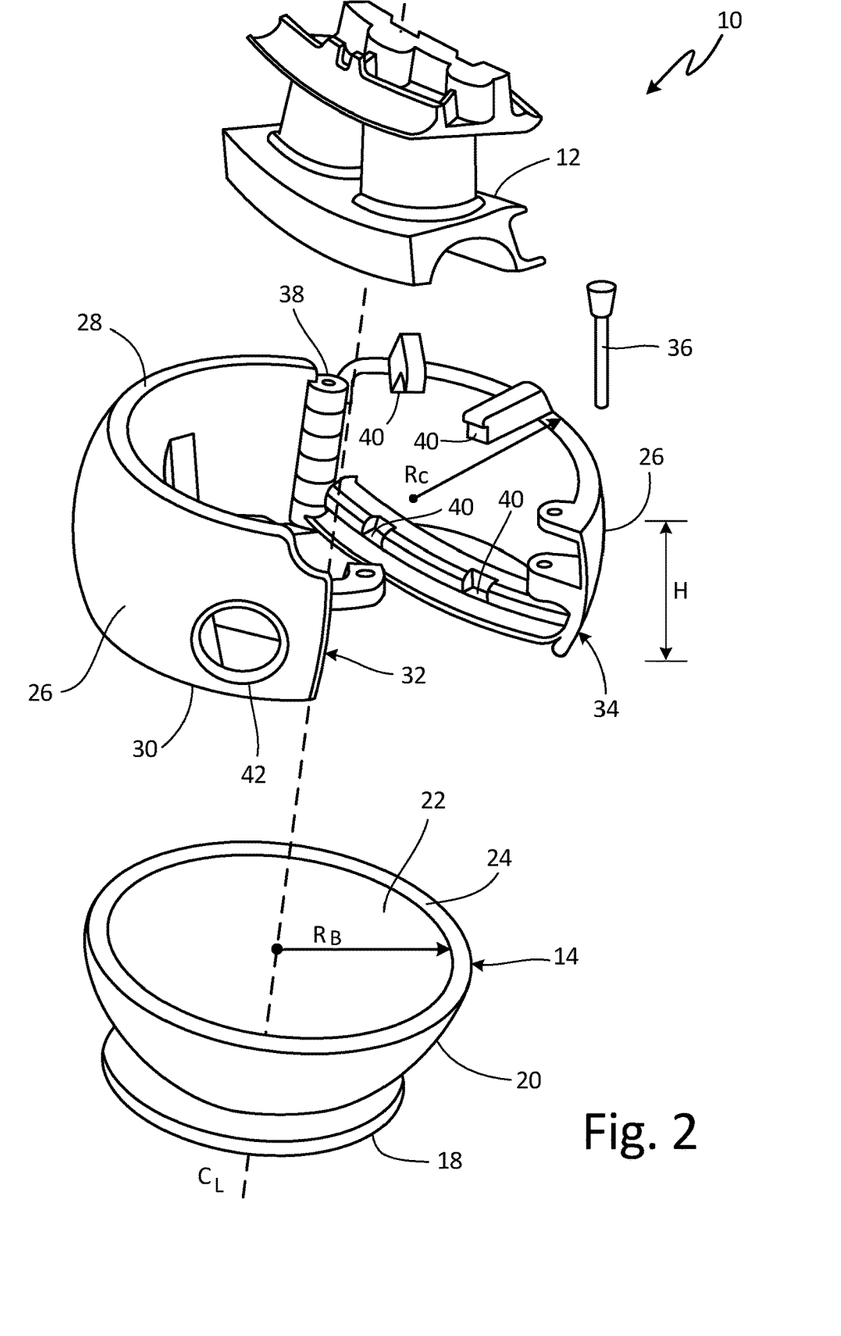
FIG. 2 is an exploded view of the spherical articulating fixture that includes a base and a clamp for holding the part.

Clamp 16 has a spherical external surface 26 which is in the form of a spherical segment with a radius of curvature $R_C$ (shown in FIG. 2). More specifically, external surface 26 has the form of a sphere that is truncated by two parallel planes at first end 28 and second end 30 (shown in FIG. 2). Clamp 16 is configured to be positioned in bowl 20 so as to be constrained laterally and vertically downwards by rim 24, although clamp 16 is not constrained rotationally or vertically upwards. In this manner, clamp 16 does not solely contact bottom 18 of base 14, and clamp is rotatable within bowl 20. Therefore, radius $R_C$ is substantially equal to or greater than radius $R_B$, and clamp 16 has a height H that is sufficient to provide vertical overlap between internal surface 22 of bowl 20 and external surface 26 of clamp 16. In such a configuration, radii of curvature of ends 28 and 30 (not shown) are smaller than radius $R_B$.

Clamp 16 includes a component space into which part 12 can be secured. Because part 12 is secured in clamp 16 in FIG. 1, the component space of clamp 16 is indicated by part 12 in FIG. 1. The component space does not extend beyond a complete sphere formed by radius $R_B$ and only extends beyond at most one of ends 28 and 30 (shown in FIG. 2). In such a configuration, clamp 16 can rest stably on second end 30, on, for example, a workbench (not shown) while clamp 16 is holding part 12. In addition, the center of gravity of clamp 16 when holding part 12 is approximately in the center of the complete sphere formed by radius $R_B$.

The components and configuration of spherical articulating fixture 10 allow for part 12 to be held in clamp 16 and for clamp 16 to be stabilized in base 14 in any orientation selected by an operator (not shown). This is due to the force of gravity enabling friction between base 14 and clamp 16, and not due to base 14 and clamp 16 being mechanically connected together as in the prior art. Because the center of gravity of clamp 16 with part 12 is centered in the complete sphere formed by radius $R_B$, this center of gravity will approximately lie upon a vertical axis extending from the center of rim 24. This arrangement minimizes or eliminates any torque on clamp 16 due to the center of gravity being offset from the center of clamp 16. Thereby, the operator is free to exert force on clamp 16 to rotate it and change its orientation. Thereby, part 12 can be oriented in a single or multiple advantageous orientations so that, for example, part 12 can be inspected or have braze paste or another coating (not shown) applied to particular areas of part 12.

FIG. 2 is an exploded view of spherical articulating fixture 10 that includes base 14 and clamp 16 for holding part 12. In the illustrated embodiment, clamp 16 is an assembly comprised of first side 32, second side 34, and pin 36. Sides 32 and 34 are joined at hinge 38 and are rotatable relative to one another. Pin 36 is positioned through alternating holes (not shown) in sides 32 and 34, opposite of hinge 38, to lock sides 32 and 34 together when clamp 16 is fully assembled. Neither of pin 36 and hinge 38 extends beyond the complete sphere formed by radius $R_B$.

The inside of each of sides 32 and 34 also includes at least one contact surface 40 which is a surface configured to contact part 12 when clamp 16 is assembled. The outside of each of sides 32 and 34 are spherical and have the same radius of curvature $R_C$ and the same center point (not shown) when clamp 16 is assembled to hold part 12.

In order to operate spherical articulating fixture 10, clamp 16 is opened and part 12 is placed on contact surfaces 40 of one of sides 32 and 34. Clamp 16 is then closed, placing the remaining contact surfaces 40 in contact with part 12. In order to insert pin 36 into sides 32 and 34, sides 32 and 34 are squeezed together by the operator using port 42. While only one port 42 is visible on first side 32, there is another port 42 on second side 34.

Once clamp 16 is assembled, it is lifted above base 14. Then clamp 16 is moved vertically downward and placed in bowl 20 such that external surface 26 is in contact with at least rim 24. If radius $R_C$ is substantially the same as radius $R_B$, then external surface 26 will also be in contact with internal surface 22. At this time, the operator can work on part 12, for example, by applying braze paste to a particular area of part 12 through, for example, first end 28. Then operator can turn part 12 by rotating clamp 16 in bowl 20 to work on another area of part 12, for example, through second end 30.

Once all of the work operations are finished, the operator can lift clamp 16 off of base 14 and place it, for example, on a workbench (not shown). The operator can then disassemble clamp 16 by removing pin 36 and part 12.

Figure 3:
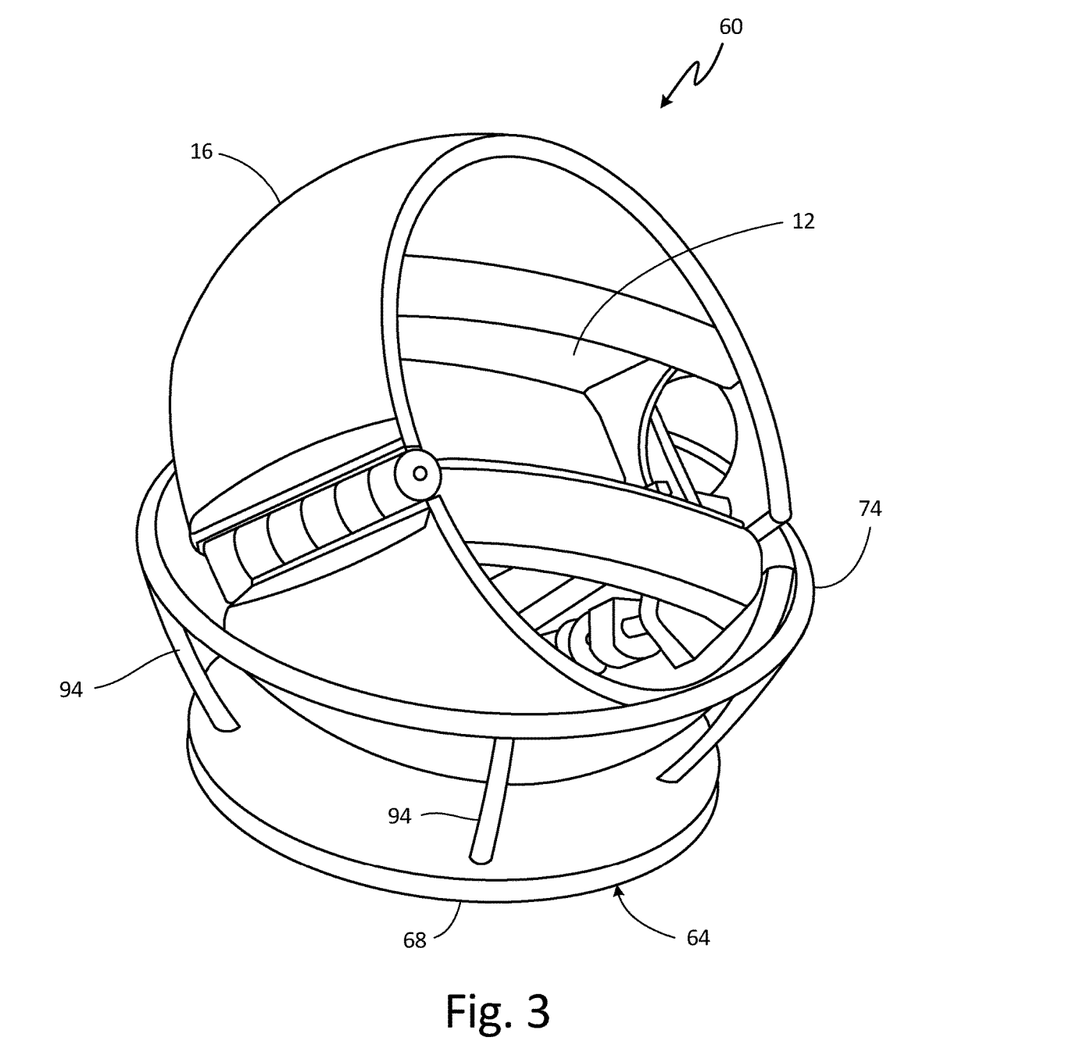
FIG. 3 is a perspective view of an alternate embodiment spherical articulating fixture with the clamp and part in a different orientation from FIG. 1.

FIG. 3 is a perspective view of an alternate embodiment spherical articulating fixture 60 with clamp 16 and part 12 in a different orientation from FIG. 1. While part 12 and clamp 16 can be the same as part 12 and clamp 16 of FIGS. 1 and 2, base 64 differs from base 14 of FIGS. 1 and 2. More specifically, base 64 comprises bottom 68 and rim 74 with a plurality of spaced apart support members 94 extending between bottom 68 and rim 74.

The configuration of spherical articulating fixture 60 allows for any debris on part 12 (such as excess braze paste) to drop clear of part 12. This can occur statically, or as clamp 16 is rotated into different positions, for example, from the position of FIG. 1 to the position of FIG. 3. Such a function can also be accomplished in spherical articulating fixture 10 of FIGS. 1 and 2 by including a hole (not shown) that extends through bottom 18 and bowl 20.

Figure 4:
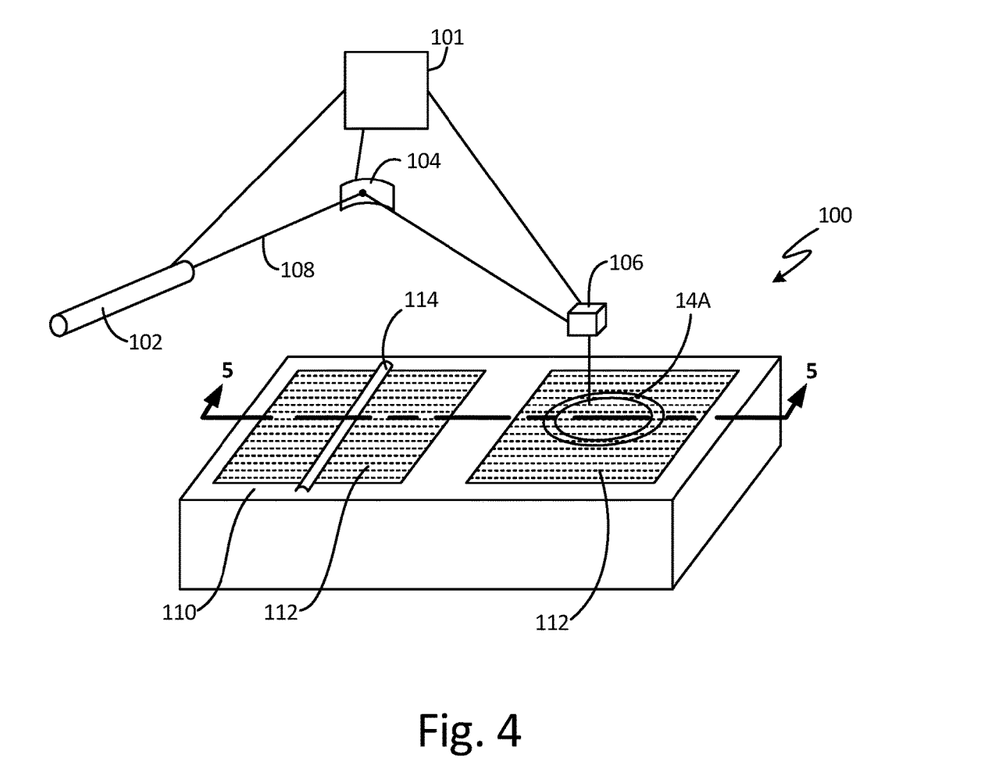
FIG. 4 is a perspective view of an additive manufacturing apparatus.

FIG. 4 is a perspective view of additive manufacturing apparatus 100. In particular, FIG. 4 shows an additive manufacturing apparatus which uses laser additive manufacturing to create a three-dimensional object out of sinterable, pulverulent material. While direct metal laser sintering (DMLS) is described, other additive manufacturing techniques may be employed, such as, for example, laser powder bed fusion, electron beam powder bed fusion, laser powder deposition, electron beam wire, and selective laser sintering.

Additive manufacturing apparatus 100 includes computer 101 and a set of optical components, including laser 102, mirror 104, and moving optical head 106, which guide laser beam 108 according to the instructions from computer 101. Laser 102 may be any source of heating radiation, such as a $CO_2$ laser. Additive manufacturing apparatus 100 also includes frame 110, pulverulent material 112, and coater 114, which are used for powder containment and application. Pulverulent material 112 may be any material suitable for use as a TOBI. Typically, pulverulent material 112 will be some combination of ceramic and/or metal. For example, pulverulent material 112 may be steel, stainless steel, or a high temperature superalloy. Coater 114 is arranged along a surface of frame 110, and may be moved across the surface of frame 110. Coater 114 may be, for example, a knife blade or a roller. As shown in FIG. 4, partially built base 14A is present inside frame 110.

A user creates a computer file for computer 101 that defines a component with particular features, such as base 14 and/or clamp 16 (shown in FIG. 1), in layers (that can be of different thicknesses). Computer 101 then controls the optical equipment to create the component. Laser 102 creates laser beam 108 which can be used for melting, sintering, or cutting. Laser 102 is pointed towards mirror 104, which is arranged to deflect laser beam 108 toward moving optical head 106. Generally, moving optical head 106 directs laser beam 108 towards areas within frame 110, which holds pulverulent material 112. Generally, the areas melted or sintered form a layer of base 14 and/or clamp 16. In FIG. 6, partially built base 14A is shown being built up on a layer-by-layer basis. Areas adjacent to partially built base 14A can remain unmelted or unsintered to form bowl 20 (shown in FIG. 2) and can provide separation in the situation where base 14 and clamp 16 are being built simultaneously to ensure that base 14 is not permanently connected to clamp 16.

After each layer of partially built base 14A is finished, the support holding partially built base 14A (shown later in FIG. 5) is lowered by the thickness of one layer of pulverulent material 112, and additional pulverulent material 112 is added on top of the existing structures using coater 114. Then new layer of pulverulent material 112 is melted or sintered to the top of partially built base 14A, and the process is repeated. By repeating the process several times, a layer-by-layer object, such as a complete base 14 can be manufactured. In addition, clamp 16 can be simultaneously manufactured or manufactured at a separate time or in a separate additive manufacturing apparatus 100.

Figure 5:
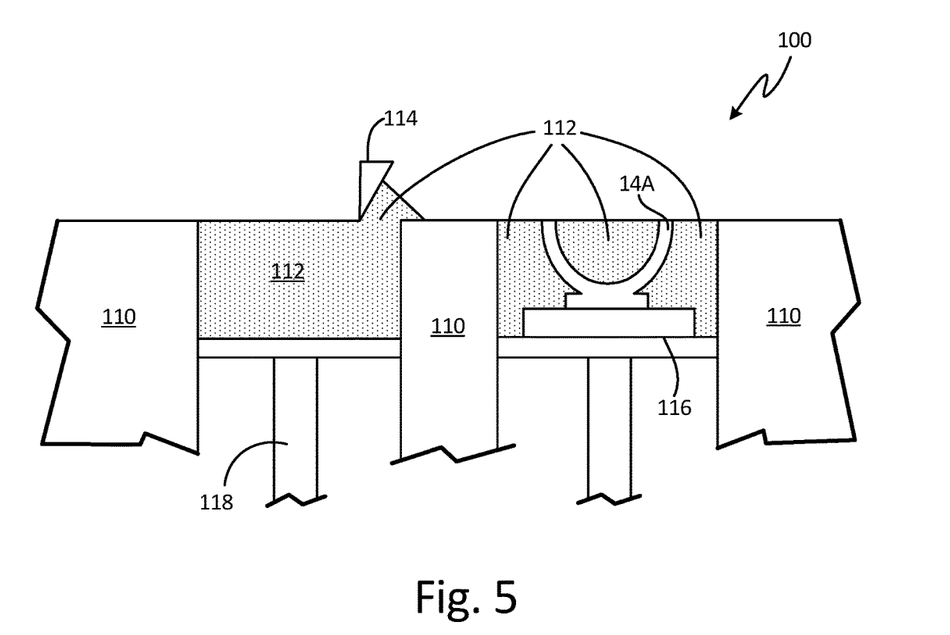
FIG. 5 is a cross section view of the additive manufacturing apparatus along line 5-5 in FIG. 4.

FIG. 5 is a cross section view of additive manufacturing apparatus 100 along line 5-5 in FIG. 4. FIG. 5 is a cutaway view that shows the operation of additive manufacturing apparatus 100. FIG. 5 shows a DMLS apparatus, but it will be understood by those skilled in the art that other additive manufacturing techniques and apparatuses may be used, such as, for example, laser powder bed fusion, electron beam powder bed fusion, laser powder deposition, electron beam wire, and selective laser sintering.

Additive manufacturing apparatus 100 as shown in FIG. 5 includes many of the same parts as those shown in FIG. 4, such as frame 110, pulverulent material 112, coater 114, and partially built base 14A. FIG. 5 also shows component support 116 and material supply support 118. Component support 116 may be used to raise or lower partially built base 14A. Material supply support 118 may be raised to elevate or lower pulverulent material 112 above the working surface of frame 110.

FIG. 5 shows the arrangement of component support 116 and material supply support 118 in addition to the arrangement of parts shown in FIG. 4. As can be seen in FIG. 5, partially built base 14A rests on component support 116. Likewise, pulverulent material 112 rests on material supply support 118.

As each layer of partially built base 14A is melted or sintered, component support 116 is lowered and material supply support 118 is raised. Coater 114 scrapes a layer of pulverulent material 112 off of the top of the supply side and applies it in a layer across the top of partially built base 14A.

The process is then repeated until base 14 (shown in FIG. 1) is complete. The thickness of the layers can be set to adjust the surface finish of base 14 and/or clamp 16 (shown in FIG. 1). The appropriate surface finishes can be selected to provide sufficient friction to prevent spontaneous movement of clamp 16 in base 14, but permit sufficiently easy movement of clamp 16 in base 14 by the operator of spherical articulating fixture 10 (shown in FIG. 1). In addition, the thickness of layers can be varied to produce different surface finishes at different locations. For example, the thickness of layers at rim 24 can be smaller than the thickness of layers at bottom 18 (both shown in FIG. 1) in order to rapidly manufacture most of base 14 while still having the appropriately finished surface for contacting clamp 16.

FIGS. 4 and 5 show one possible way of additively manufacturing spherical articulating fixture 10 as disclosed above in reference to FIGS. 1 and 2 or spherical articulating fixture 60 as disclosed above in reference to FIG. 3. Alternative methods for additively manufacturing components are possible. For example, laser powder bed fusion, electron beam powder bed fusion, laser powder deposition, electron beam wire, or selective laser sintering may be used to create objects in an additive fashion.

Discussion of Possible Embodiments

The following are non-exclusive descriptions of possible embodiments of the present invention.

A fixture according to an exemplary embodiment of this disclosure, among other possible things includes: a base having a bottom and an elevated rim; and a clamp having a clamp exterior in a shape of a portion of a clamp sphere, the clamp including a component space that is positioned wholly within the clamp sphere; wherein the clamp is positioned such that the clamp exterior is in contact with the rim.

The fixture of the preceding paragraph can optionally include, additionally and/or alternatively, any one or more of the following features, configurations and/or additional components:

A further embodiment of the foregoing fixture, wherein the portion of the sphere can be a spherical segment.

A further embodiment of any of the foregoing fixtures, wherein the clamp can include a planar side.

A further embodiment of any of the foregoing fixtures, wherein the clamp can comprise: a first side comprising: a first exterior having a first shape of a first portion of a first sphere; and a first interior opposite of the first exterior having a first component contact surface that partially defines the component space; and a second side comprising: a second exterior having a second shape of a second portion of a second sphere; and a second interior opposite of the second exterior having a second component contact surface that partially defines the component space; wherein the first side is connectable to the second side to form an assembled clamp wherein the first sphere and the second sphere share a common radius and a common centerpoint with the clamp sphere and the component space does not extend beyond the clamp sphere.

A further embodiment of any of the foregoing fixtures, wherein the assembled clamp can form a spherical segment outside of which the component space at most extends through a first end of the spherical segment.

A further embodiment of any of the foregoing fixtures, wherein the first side of the clamp can be rotatably connected to the second side of the clamp at a hinge.

A further embodiment of any of the foregoing fixtures, wherein the first side can be connectable to the second side opposite of the hinge.

A further embodiment of any of the foregoing fixtures, wherein the first side can be connectable to the second side using a pin inserted into the first side and the second side opposite of the hinge.

A further embodiment of any of the foregoing fixtures, wherein the hinge and the pin can be positioned wholly within the clamp sphere.

A further embodiment of any of the foregoing fixtures, wherein the fixture can further comprise: a bowl that extends between the bottom and the rim, the bowl having a spherical interior surface.

A further embodiment of any of the foregoing fixtures, wherein the fixture can further comprise: a plurality of spaced apart support members that extends between the bottom and the rim.

A further embodiment of any of the foregoing fixtures, wherein the fixture can further comprise: a component positioned in the component space, wherein the center of gravity of the clamp with the component is positioned along an axis extending from the center of the rim.

A method of using a fixture that includes a clamp with a spherical exterior, a first portion with a first contact surface, a second portion with a second contact surface, and a base with a spherical or circular rim of the base, the method according to an exemplary embodiment of this disclosure, among other possible things includes: placing a component in contact with the first contact surface of the first portion of the clamp; placing the second contact surface of the second portion of the clamp in contact with the component; placing the spherical exterior of the clamp into contact with the rim of the base such that the component is in a first orientation; applying a coating to a first area of the component; and exerting force on the clamp to orient the component in a second orientation.

The method of the preceding paragraph can optionally include, additionally and/or alternatively, any one or more of the following features, configurations and/or additional components:

A further embodiment of the foregoing method, wherein the method can further comprise: applying a coating to a second area of the component that is different than the first area.

A further embodiment of any of the foregoing methods, wherein placing the second contact surface in contact with the component can comprise rotating the second portion about a hinge that connects the first portion to the second portion.

A further embodiment of any of the foregoing methods, wherein placing the second contact surface in contact with the component can comprise inserting a pin to connect the first portion to the second portion.

A further embodiment of any of the foregoing methods, wherein placing the clamp into contact with the rim can comprise moving the clamp vertically downward from above the base.

A fixture according to an exemplary embodiment of this disclosure, among other possible things includes a base having a bottom and an elevated rim, and a clamp having an exterior in a shape of a portion of a sphere, the clamp including a component space that is positioned wholly within the sphere, wherein the clamp is configured to be positioned in in contact with the rim, the fixture being made by the steps of: selectively sintering a first layer of pulverulent material within a frame to make a partially built fixture; lowering the partially built fixture; adding a second layer of pulverulent material on top of the partially built fixture; and selectively sintering the second layer of pulverulent material to the partially built fixture.

The method of the preceding paragraph can optionally include, additionally and/or alternatively, any one or more of the following features, configurations and/or additional components:

A further embodiment of the foregoing method, wherein the fixture can be made by the further steps of: lowering the partially built fixture after selectively sintering the second layer; adding a third layer of pulverant material on top of the partially built fixture; and selectively sintering the second layer of pulverant material to the partially built fixture; wherein the third layer of pulverant material is substantially larger than the second layer of pulverant material.

A further embodiment of any of the foregoing methods, wherein the clamp can be formed simultaneously with the base.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fixture comprising:
   a base having a bottom and an elevated rim; and
   a clamp having a clamp exterior in a shape of a portion of a clamp sphere and a component space that is positioned wholly within the clamp sphere, the clamp comprising:
      a first side comprising:
         a first exterior having a first shape of a first portion of a first sphere; and
         a first interior opposite of the first exterior having a first component contact surface that partially defines the component space; and
      a second side comprising:
         a second exterior having a second shape of a second portion of a second sphere; and
         a second interior opposite of the second exterior having a second component contact surface that partially defines the component space;
   wherein:
      the clamp is positioned such that the clamp exterior is in contact with the rim;
      the first side is connectable to the second side to form an assembled clamp;
      the first sphere and the second sphere share a common radius and a common centerpoint with the clamp sphere;
      the first side is rotatably connected to the second side at a hinge; and
      the component space does not extend beyond the clamp sphere.

2. The fixture of claim 1, wherein the portion of the clamp sphere is a spherical segment.

3. The fixture of claim 1, wherein the clamp includes a planar side.

4. The fixture of claim 1, wherein the assembled clamp forms a spherical segment outside of which the component space at most extends through a first end of the spherical segment.

5. The fixture of claim 1, wherein the first side is connectable to the second side opposite of the hinge.

6. The fixture of claim 5, wherein the first side is connectable to the second side using a pin inserted into the first side and the second side opposite of the hinge.

7. The fixture of claim 6, wherein the hinge and the pin are positioned wholly within the clamp sphere.

8. The fixture of claim 1, further comprising:
   a bowl that extends between the bottom and the rim, the bowl having a spherical interior surface.

9. The fixture of claim 1, further comprising:
   a plurality of spaced apart support members that extends between the bottom and the rim.

10. The fixture of claim 1, further comprising:
    a component positioned in the component space, wherein the center of gravity of the clamp with the component is positioned along an axis extending from the center of the rim.

11. A method of using a fixture comprising:
    a base having a bottom and an elevated rim; and
    a clamp having a clamp exterior in a shape of a portion of a clamp sphere and a component space that is positioned wholly within the clamp sphere, the clamp comprising:
       a first side comprising:
          a first exterior having a first shape of a first portion of a first sphere; and
          a first interior opposite of the first exterior having a first component contact surface that partially defines the component space; and
       a second side comprising:
          a second exterior having a second shape of a second portion of a second sphere; and
          a second interior opposite of the second exterior having a second component contact surface that partially defines the component space;
    wherein:
       the clamp is positioned such that the clamp exterior is in contact with the rim;
       the first side is connectable to the second side to form an assembled clamp;
       the first sphere and the second sphere share a common radius and a common centerpoint with the clamp sphere;
       the first side is rotatably connected to the second side at a hinge; and
       the component space does not extend beyond the clamp sphere,
    the method comprising:
       placing a component in contact with the first component contact surface of the first side of the clamp;
       placing the second component contact surface of the second side of the clamp in contact with the component;
       placing the clamp exterior into contact with the elevated rim of the base such that the component is in a first orientation;
       applying a first coating to a first area of the component; and
       exerting force on the clamp exterior to orient the component in a second orientation.

12. The method of claim 11, further comprising:
applying a second coating to a second area of the component, the second area being different from the first area.

13. The method of claim 11, wherein placing the second component contact surface of the second side of the clamp in contact with the component comprises rotating the second side about the hinge that connects the first side to the second side.

14. The method of claim 13, wherein placing the second component contact surface of the second side of the clamp in contact with the component comprises inserting a pin to connect the first side of the clamp to the second side of the clamp.

15. The method of claim 11, wherein placing the clamp exterior into contact with the elevated rim of the base comprises moving the clamp vertically downward from above the base.

16. The fixture of claim 1, the fixture being made by the steps of:
selectively sintering a first layer of pulverulent material within a frame to make a partially built fixture;
lowering the partially built fixture;
adding a second layer of pulverulent material on top of the partially built fixture; and
selectively sintering the second layer of pulverulent material to the partially built fixture.

17. The fixture of claim 16, the fixture being made by the further steps of:
lowering the partially built fixture after selectively sintering the second layer;
adding a third layer of pulverant material on top of the partially built fixture; and
selectively sintering the third layer of pulverant material to the partially built fixture;
wherein the third layer of pulverant material is substantially larger than the second layer of pulverant material.

18. The fixture of claim 16, wherein the clamp is formed simultaneously with the base.

* * * * *